United States Patent [19]
McCarter

[11] 3,802,138
[45] Apr. 9, 1974

[54] TIEDOWN DEVICE FOR TRAILERS

[76] Inventor: Charles W. McCarter, R.R. No. 1, Box 326, Imperial, Mo. 63052

[22] Filed: May 15, 1972

[21] Appl. No.: 253,609

[52] U.S. Cl................ 52/148, 52/149, 52/295, 248/361 R
[51] Int. Cl.............................................. E02d 5/80
[58] Field of Search.......... 52/4, 23, 146, 148, 149, 52/155, 150, 292; 248/354 S, 354 H, 361 A, 361 R

[56] References Cited
UNITED STATES PATENTS

| | | | |
|---|---|---|---|
| 3,403,487 | 10/1968 | Docter | 52/23 |
| 3,724,151 | 4/1973 | Kaywood | 52/23 |
| 885,043 | 4/1908 | Hambay | 52/295 |
| 2,979,304 | 4/1961 | Teel | 248/354 S |
| 3,645,057 | 2/1972 | Kaplan | 52/295 |
| 2,240,427 | 4/1941 | Thomsen | 52/295 X |
| 3,054,151 | 9/1962 | Shankland | 52/23 |
| 2,143,288 | 1/1939 | Stolz | 52/295 |

*Primary Examiner*—John E. Murtagh
*Attorney, Agent, or Firm*—Rogers, Ezell & Eilers

[57] ABSTRACT

A tiedown device for trailers having a channel anchored to the ground, two bolts rising from one flange of the channel and supported thereon, the bolts adjustably supporting at their upper ends an angle iron brought to underlie the fore and aft I-beam of the trailer; the bolts passing the I-beam and having holddown plates clamped by nuts on the bolts over the feet of the I-beam, thus holding the I-beam and the trailer against forces of either tension or compression applied to the bolts. There is a square headed and shank strap tension bolt extending through the flanges of the channel at the bottom to engage the end of a strap which extends around the trailer and down to a similar bolt at the tiedown on the opposite side of the trailer. The strap can be tensioned by moving the bolt axially to displace a squared part of the bolt shank from a squared hole in the channel, so that the bolt can be turned to tighten the strap. When tight, the bolt shank is again displaced axially to dispose its squared part in the squared hole and to prevent unwinding of the strap. Holes are provided for turnbuckles and cross members that can crisscross beneath the trailer to prevent it from being twisted.

8 Claims, 3 Drawing Figures

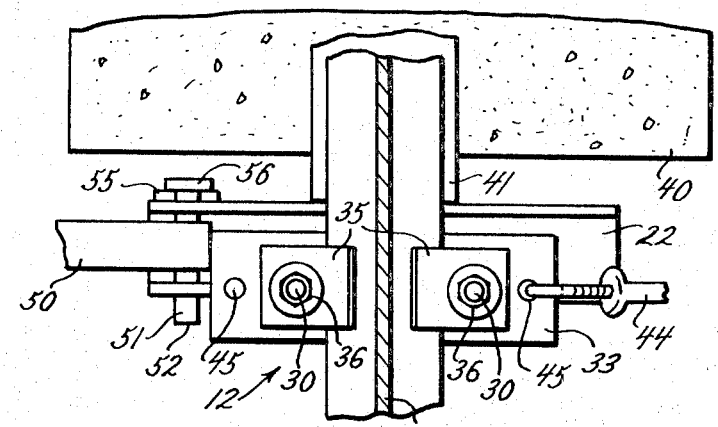
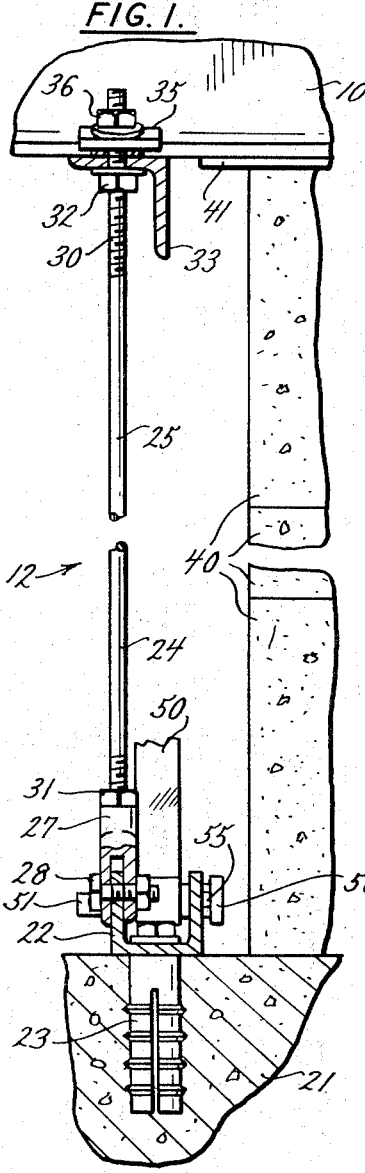
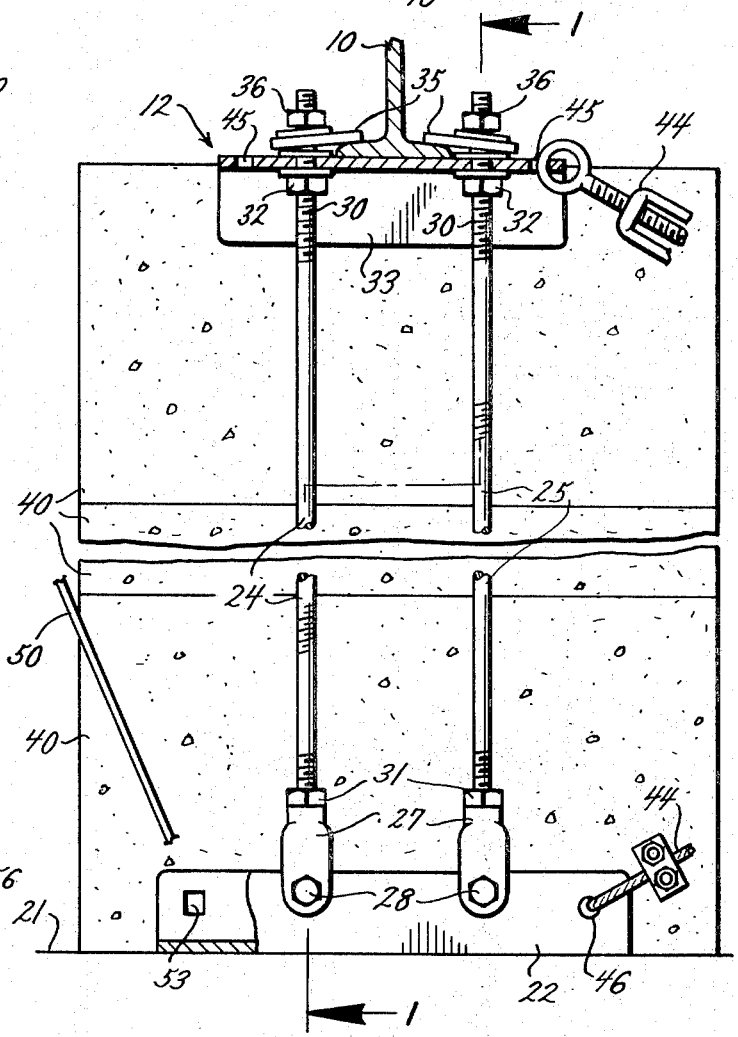

TIEDOWN DEVICE FOR TRAILERS

BACKGROUND OF THE INVENTION

Heretofore jacks of a more or less conventional nature have been used under trailers to support them. The jacks may have been anchored to the ground and may have had clamps engaging the I-beams forming the bed of the trailer. However, these were expensive and inconvenient. Many of them were not strong in tension so that they did not well resist windage to blow the trailer off them. Some prior art devices have had beams secured to the top of jacks and extending across the entire trailer to engage the underside of both I-beams. These are also costly and difficult to install.

The present tiedown, which can be constructed of relatively inexpensive off-the-shelf components, can nevertheless hold against either tension or compression. Usually four to six tie-downs are used, several along each side frame I-beam of the bed of the trailer. For compressive forces, the tie-downs optionally may be aided by building blocks located adjacent each one, under the beams of the trailer. The provision of the straps that can be tensioned from one tie-down around the entire trailer to another tie-down on the opposite side aids in stabilizing it against wind forces, and crisscrossed turnbuckle stretchers that extend from one tie-down angularly to another under the trailer resist twisting movement, since they provide a form of X-frame tension members beneath the trailer. When the tie-down is disassembled, it is compact for packaging and shipping. It can be assembled with ordinary tools by a person of modest mechanical skill.

In the drawings:

FIG. 1 is a sectional view looking at the side of the trailer taken on the line 1—1 of FIG. 2, showing a tension bolt in place;

FIG. 2 is a view partly in section looking lengthwise of the trailer; and

FIG. 3 is a top view of the installation shown in FIG. 2.

DESCRIPTION OF THE PREFERRED EMBODIMENT

Trailers, mobile homes and like equipment, here collectively referred to as trailers, regularly have two I-beams 10, one extending along on each side of the bottom of the trailer. Usually there are transverse beams, not shown, beneath the trailer at spaced points. In order to have a firm mounting for the trailer, the present tiedowns are used.

Preferably each tiedown, generally designated 12, is mounted in concrete, the shape and condition of which varies from place to place. There is here illustrated a concrete fill 21 extending down into the earth, and onto which a channel 22 forming the base portion of the present tiedown, is mounted. A typical bolt-and-expansion shield 23, such as a Keystone single expansion shield and bolt arrangement, can be used to secure the channel 22 firmly to the concrete, enough bolts 23 being used to satisfy the strength requirements.

The channel 22 has its two side flanges opening upward. Two threaded tie members 24 and 25 are secured by bolts 27 to one of the flanges of the channel 22. The threaded members 24 and 25 are identical so only one need be described.

As illustrated, the assembly 24 has secured to its lower end a drop forged SAE yoke bolt 27 which straddles the flange of the channel 22 and is anchored therein by a bolt 28 or other equal means such as a rivet. The threaded rod 24 is screwed into the top of the yoke bolt, and is anchored therein by a lock nut 31. Preferably the rod 24 is threaded its entire length, and may be a stock threaded rod.

The rod 24 is long enough to extend upwardly alongside the I-beam 10. Adjacent its upper end, each of the rods 24 and 25 has a nut 32 threaded onto it. Above the nut the rods pass through holes in the ends of an angle iron 33. The angle iron 33 thus is supported upon the rods 24 and 25 resting on the nuts 32 threaded onto the rods. The nuts are adjusted on the rods 24 and 25 to position the angle iron 33 just below the bottom of the beam 10 and in contact therewith, to support the angle iron 33 in a position to hold and give support in turn to the I-beam 10.

The bolts 24 and 25 are positioned to extend near to, but on opposite sides of the lower flanges of the I-beam 10. Plates 35 having holes through them are fitted over the bolts 30, and with appropriate washers, nuts 36 are then threaded onto the bolts 30 to clamp the plates 35 firmly down so that they engage the bottom flanges of the beam 10 and hold it against being lifted off of the angle iron 33 by forces acting in any direction.

Usually the user of this equipment will stack building blocks 40 below the I-beams 10 to aid in giving permanent and solid support. Shims 41 are driven in between the I-beams and the top building block 40 after the bolt assemblies 24 and 25 have been tightened in place. This arrangement gives greater stability to the trailer and a firmness to its floors.

As will be understood, about three pairs of these tie-downs are located along each side of the average trailer. Diagonal criss-crossing turnbuckle stretchers can be employed, extending from the upper plate 33 on one side to the base member 22 on the other side. These may comprise a turnbuckle loop attached to a cable. The stretchers diagrammatically illustrated at 44 are looped through holes 45 at the end of the angles 33, and extend down and across to fit into holes 46 in the flange of the corresponding base member 22 at the opposite side of the trailer. The turnbuckles are tightened to take all looseness out of the stretchers. These stretchers prevent torque from distorting the trailer support. Also with the present arrangement each channel 22 supports an end of a holddown strap 50. The strap extends around the top of the trailer, down the other side and has its other end anchored to an opposite tiedown in the manner to be described.

The end of the strap 50 is wound about a tension bolt 51 such as a "Minute Man" strap tension bolt. The shank of this bolt has a squared portion 52 that can engage in a squared hole 53 in the channel. When this bolt is displaced axially in the channel which, as illustrated in FIG. 3, is downward, the square portion of the bolt is displaced out of the square hole 53 and portions are thereupon located in the hole 53 and are rotatable therein. A wrench applied to the squared end 52 of the bolt then can be used to turn the bolt and wind or unwind the strap 50, making it tighter or looser. After the strap is brought to the proper tension, the bolt is again axially displaced in the other direction so that the squared portion 52 engages in the squared hole 53 to retain it against rotation in that position. After it is retained, a lock member 55 may be passed through a diametrical hole in the bolt above its inner head 56 to prevent accidental displacement of the squared portion from the squared hole. Use:

In use the trailer is brought to position over the concrete ground inserts or platform and the channel 22 for each of the four or six tiedowns is anchored thereto by the locking bolts 23. The channels are disposed crosswise of the trailer. The bolt assemblies 24 and 25 of each tiedown are then attached to the channel by the bolts 28 and are extended upwardly and passed through the holes in the angle iron 33. The nuts 32 are adjusted to bring the angle iron 33 firmly against the bottom of the elongated I-beam 10. Thereafter the anchor plates 35 with washers are dropped over the projecting ends of the bolts and the nuts 35 are screwed firmly down. When this is done, the building blocks 40 may be piled up, and shimmed into place by driving the shims 41 between the beam 10 and the top building block.

The straps 50 are extended over the top of the trailer to its opposite side with the ends secured to the strap tension bolts 51 of correspondingly disposed tiedowns. In the manner previously described, the tension bolts 51 are tightened to make the straps entirely firm in securing the trailer to the tiedowns.

After the tiedowns are firmly secured, and preferably after the straps 50 are attached, the turnbuckle stretchers 44 are crisscrossed beneath the trailer, attached at their ends in holes 45 of the tiedown angle iron 33, and are tightened into taut condition to keep twisting from occurring.

Typically, the base channel 22 can be of appropriate steel such as M10-20 Merchants steel, $2'' \times 2'' \times 5/16'' \times 8''$. The angle iron 33 can be $2'' \times 2'' \times 5/16'' \times 6''$. The rods 24 and 25 can be ½'' rods of appropriate steel, natural fine threaded stock, attached to dropforged SAE yoke bolts.

The adjustment of the nuts 32 sets the height above ground of the floor of the trailer. This adjustment can be used to level the floor, and to assure a firm footing of the trailer on the building blocks to prevent the shims from working loose.

Various changes and modifications may be made within this invention as will be readily apparent to those skilled in the art. Such changes and modifications are within the scope and teaching of this invention as defined by the claims appended hereto.

What is claimed is:

1. A tiedown mechanism for trailers, mobile homes and the like that have flanged beams on their undersides, comprising: a base member to be secured to the ground below a flanged beam, the base member having means by which it may be secured to the ground; attaching means comprising a pair of rods secured to the base member and extending upwardly therefrom toward the bottom of the trailer; a plate adapted to be held against a beam on the underside of the trailer, the plate having openings through which the ends of the rods project; means to hold the plate on the rods against the underside of the beam; the plate being dimensioned so that the rods extend above the opposite sides of the beam and alongside the flanges on the beam; means to overlie the flanges, said means being secured to ends of the rods above the plate and means on the ends of the rods clamping the overlying means against the flanges on opposite sides of the beam and the plate to hold the flanges against upward, lateral or downward movements relatively to the beam.

2. The mechanism of claim 1, wherein the base member has an upstanding flange, and yokes straddle the flange and are secured to the flange and the rods.

3. In the tiedown of claim 1: each means overlying the flanged beam comprising a plate having an opening by which it is fitted over the rod, and a length such that it can extend over the flange on one side of the rod and against the plate on the other, and a nut threaded onto the rod to force the overlying means against the flange and the plate.

4. In the tiedown of claim 1: the base member having two oppositely disposed walls, a bolt extending across from wall to wall; a strap secured to the bolt, to be extended over the trailer and have its opposite end secured on the opposite side of the trailer, means to releasably hold the bolt against turning, so that when the bolt has been turned to position to tighten the strap, the bolt may be releasably secured in such position.

5. In the tiedown of claim 1, the plate and the base member having stretcher attachment means, to hold the ends of stretchers crisscrossed located beneath the trailer.

6. In the trailer of claim 1, a pair of such tiedowns for disposition on opposite sides of the trailer, stretchers attached to the plate of each tiedown and extending across to the base member of the other, each stretcher including a turnbuckle means by which it can be tightened.

7. In the combination of claim 1, the attaching means including a tension means extending from the ground-engaging means upwardly and outwardly to be attached to the vehicle to secure the vehicle on opposite sides, to the ground.

8. In the combination of claim 7, the tension means comprising a member extending from one ground-engaging member outwardly and upwardly to pass over the top of the vehicle, across it, then downwardly and inwardly to the ground-engaging member on the opposite side of the vehicle.

* * * * *